Nov. 13, 1945.  A. E. BEGUIN ET AL  2,388,817
SUBBING PHOTOGRAPHIC FILM
Filed Sept. 15, 1944
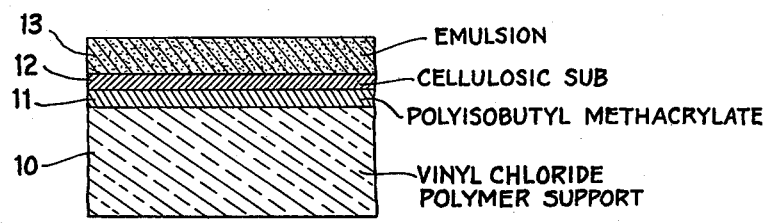
ALBERT E. BEGUIN
DONALD R. SWAN
INVENTORS
BY
ATTORNEYS Patented Nov. 13, 1945

2,388,817

UNITED STATES PATENT OFFICE 2,388,817

SUBBING PHOTOGRAPHIC FILM

Albert E. Beguin, Rochester, N. Y., and Donald R. Swan, Cleveland, Ohio, assignors to Eastman Kodak Company, Rochester, N. Y., a corporation of New Jersey Application September 15, 1944, Serial No. 554,252

3 Claims. (Cl. 95—9)

This invention relates to subbing photographic film and particularly to subbing polyvinyl chloride film supports.

The use of polyvinyl resins as photographic film supports has been suggested in prior patents. Stinchfield U. S. Patent 1,627,935, granted May 10, 1927, describes the use of polyvinyl chloride as a film support and McNally U. S. Patent 2,196,775, granted April 9, 1940, describes subbing polyvinyl acetate film support with polyacrylic esters.

Film supports of vinyl chloride polymers, such as polyvinyl chloride, are useful for certain photographic applications because of their low shrink and swell amplitude, that is, low tendency to dimensional change upon storage or when subjected to conditions of varying temperature and humidity. Such supports are desirable for films used in aerial photography or map photography where dimensional change in the film is highly undesirable.

While this low dimensional change is exhibited by certain polyvinyl resins, such as polyvinyl chloride and copolymers of vinyl chloride and vinyl acetate containing at least 80% vinyl chloride, not all polyvinyl resins have the desired low shrink and swell amplitude. Polyvinyl acetate, for example, is not much better in this respect than cellulose esters.

It is, therefore, an object of the present invention to provide a method for subbing vinyl chloride polymer photographic supports. A further object is to provide a photographic film having satisfactory adhesion and stripping properties and at the same time possessing low shrink and swell amplitude. Other objects will appear from the following description of our invention.

These objects are accomplished by using as the photographic support a vinyl chloride polymer containing at least 80% vinyl chloride and subbing the support with polybutylmethacrylate, preferably polyisobutylmethacrylate or a mixture of the normal and iso polymers containing at least 70% of the isobutylmethacrylate.

In the accompanying drawing, the single figure is a sectional view of a film constructed according to our invention.

The problems presented by the use of polyvinyl chloride as a photographic film support are its inertness and its susceptibility to solvent retention. It would be expected that the subbing solution applied to the polyvinyl chloride support should contain solvents which attack the support so that adhesion of the sub to the support is secured. However, if a solvent is used which attacks the support, it is very difficult to remove the last traces of solvent without prolonged heating at high temperatures. This causes curling of the support and it is impossible to keep the film in a flat condition until all of the solvent is removed. Attempts to coat the polyvinyl chloride support with solutions of polyethylmethacrylate in acetone and ethyl alcohol resulted in poor stripping qualities especially when the film was wet, and in solvent retention.

It occurred to us that the use of a polymerized higher aliphatic acid ester of methacrylic acid coated from a solution of a non-solvent for the support might solve the difficulties. Accordingly, we tried the polybutylmethacrylates in solution in paraffinic hydrocarbons and found that the properties of the coating were greatly improved. The polyisobutyl ester of methacrylic acid was found to be very satisfactory although mixtures of polyisobutylmethacrylate and poly-n-butylmethacrylate containing at least 50% of the isobutyl polymer can be used. These are applied from solution in a paraffinic hydrocarbon, such as Bayway naphtha. These solvents have no effect on the vinyl chloride support and at the same time satisfactory adhesion, both wet and dry, is obtained. This adhesion depends upon the compatibility of the substratum with the support and not upon the solvent action of the substratum solution on the support.

The polybutylmethacrylate sub was coated with a layer of a cellulosic sub, such as cellulose nitrate and gelatin, followed by the emulsion layer. A thin gelatin sub can also be incorporated between the cellulosic sub and the emulsion.

Our invention will be further understood by reference to the following example:

A film support of polyvinyl chloride was coated with a solution of Bayway naphtha containing 0.3% by weight of poly-n-butylmethacrylate and 0.7% of polyisobutylmethacrylate. This coating was allowed to dry and was then coated with a cellulose nitrate and gelatin sub of the following composition:

Cellulose nitrate (alcohol soluble)

| | percent | 0.17 |
|---|---|---|
| Gelatin | do | 1.0 |
| Acetic acid | do | 1.0 |
| Acetone | do | 10.0 |
| Water | do | 6.0 |
| Methyl alcohol | do | 81.83 |

Chromic chloride percent of weight of gelatin__ 1.5

After again curing the subbing layer, the film was coated with a gelatino-silver halide emulsion and dried at room temperature.

The preparation of polyisobutylmethacrylate is described in Barrett and Strain U. S. Patent 2,129,668 granted September 13, 1938.

Our invention will now be described by reference to the accompanying drawing. As shown therein, the support 10 of vinyl chloride polymer is coated with a layer 11 of polyisobutylmethacrylate or a mixture of the iso and normal polymers, and after drying this coating, a cellulosic sub 12 is applied followed by the emulsion layer 13.

In order to determine whether a coated photographic film is satisfactory from a physical standpoint, it is customary to subject it to wet and dry stripping tests and brittleness tests. These tests have been described in the prior art and when the film coated according to our invention is subjected to the usual wet and dry stripping tests, it is found to be satisfactory. The coated film is generally more brittle than is desirable, but this can be overcome by coating the gelatin emulsion layer thinner than normal.

A further difficulty known as "skidding" is present to an undesirable extent in some photographic films. Skidding is the slipping of the dry photographic emulsion with respect to the support at elevated temperatures. The method of determining skidding has been to cut a cross in the dry emulsion but not through the support, with a sharp knife and then suspend the film at an elevated temperature for about an hour and then measure the distance which the two edges of the cut emulsion draw apart. When tested in this way, the film coated with polyisobutylmethacrylate exhibited no skidding after being subjected to a temperature of 130° F. for one hour, while that coated with poly-n-butylmethacrylate showed skidding in proportion to the thickness of the emulsion and the temperature at which the test was made.

In addition to using gelatin emulsions, it is also possible to use non-gelatin silver halide emulsions. For example, a 5% solution of low viscosity polyvinyl acetate in ethyl alcohol containing dispersed silver halide may be used.

It will be understood that the examples and modifications included herein are illustrative only and that our invention is to be taken as limited only by the scope of the appended claims.

We claim:

1. A photographic film having low shrink and swell amplitude, comprising a support of a vinyl chloride polymer containing at least 80% vinyl chloride, and in order thereon, a layer of a polybutyl methacrylate containing at least 50% polyisobutyl methacrylate, a cellulosic subbing layer and an emulsion layer.

2. A photographic film having low shrink and swell amplitude, comprising a support of a vinyl chloride-vinyl acetate co-polymer containing at least 80% vinyl chloride, and in order thereon, a layer of a polybutyl methacrylate containing at least 70% polyisobutyl methacrylate, a cellulosic subbing layer, and an emulsion layer.

3. A photographic film having low shrink and swell amplitude, comprising a support of a vinyl chloride-vinyl acetate co-polymer containing at least 80% vinyl chloride, and in order thereon, a layer of polyisobutyl methacrylate, a cellulose nitrate and gelatin subbing layer, and an emulsion layer.

ALBERT E. BEGUIN.
DONALD R. SWAN.